(12) United States Patent
Wang et al.

(10) Patent No.: US 11,475,681 B2
(45) Date of Patent: Oct. 18, 2022

(54) IMAGE PROCESSING METHOD, APPARATUS, ELECTRONIC DEVICE AND COMPUTER READABLE STORAGE MEDIUM

(71) Applicant: Samsung Electronics Co., Ltd., Gyeonggi-do (KR)

(72) Inventors: Xiaobing Wang, Beijing (CN); Yingying Jiang, Beijing (CN); Xiangyu Zhu, Beijing (CN); Hao Guo, Beijing (CN); Yi Yu, Beijing (CN); Pingjun Li, Beijing (CN); Zhenbo Luo, Beijing (CN)

(73) Assignee: Samsung Electronics Co., Ltd

( * ) Notice: Subject to any disclaimer, the term of this patent is extended or adjusted under 35 U.S.C. 154(b) by 48 days.

(21) Appl. No.: 16/967,220

(22) PCT Filed: Dec. 3, 2019

(86) PCT No.: PCT/KR2019/016928
§ 371 (c)(1),
(2) Date: Aug. 4, 2020

(87) PCT Pub. No.: WO2020/138745
PCT Pub. Date: Jul. 2, 2020

(65) Prior Publication Data
US 2021/0081695 A1    Mar. 18, 2021

(30) Foreign Application Priority Data
Dec. 24, 2018   (CN) .......................... 201811585134.9

(51) Int. Cl.
G06V 20/00        (2022.01)
G06V 20/62        (2022.01)
(Continued)

(52) U.S. Cl.
CPC ............ *G06V 20/62* (2022.01); *G06N 3/0454* (2013.01); *G06T 7/13* (2017.01); *G06V 10/44* (2022.01); *G06V 30/10* (2022.01)

(58) Field of Classification Search
CPC combination set(s) only.
See application file for complete search history.

(56) References Cited

U.S. PATENT DOCUMENTS 5,048,099 A * 9/1991 Lee ...................... G06V 30/182
                                                      382/175
8,633,930 B2  1/2014 Mansfield
(Continued)

FOREIGN PATENT DOCUMENTS

EP       3214577        9/2017
WO    WO2016065701    5/2016

OTHER PUBLICATIONS

Lyu et al, Multi-oriented scene text detection via corner localization and region segmentation, arXiv:1802.08948v2 Feb. 27, 2018).*
(Continued)

*Primary Examiner* — Nancy Bitar
*Assistant Examiner* — Xiao Liu
(74) *Attorney, Agent, or Firm* — The Farrell Law Firm, P.C.

(57) ABSTRACT

The present application discloses an image processing method, apparatus, electronic device and computer readable storage medium. The image processing method comprises detecting a text region in an image to be processed, recognizing the text region to obtain a text recognition result. In this application, the text recognition in the image to be processed is realized, the recognition manner for the text in the image is simplified, and the recognition effect for the text is improved.

12 Claims, 14 Drawing Sheets

(51) Int. Cl.
  *G06T 7/13*  (2017.01)
  *G06N 3/04*  (2006.01)
  *G06V 10/44* (2022.01)
  *G06V 30/10* (2022.01)

(56) References Cited

U.S. PATENT DOCUMENTS

| | | | |
|---|---|---|---|
| 9,058,644 B2* | 6/2015 | Ramos | G06K 9/03 |
| 2012/0092329 A1* | 4/2012 | Koo | G06K 9/3258 |
| | | | 345/419 |
| 2021/0012101 A1* | 1/2021 | Khomenko | G06K 9/00409 |

OTHER PUBLICATIONS

Moysset et al, Full-Page Text Recognition: Learning Where to Start and When to Stop, 2017 14th IAPR International Conference on Document Analysis and Recognition (ICDAR), pp. 871-876 (Year: 2017).*

PCT/ISA/210 Search Report issued on PCT/KR2019/016928, dated Mar. 9, 2020, pp. 3.
PCT/ISA/237 Written Opinion issued on PCT/KR2019/016928, dated Mar. 9, 2020, pp. 5.
Lyu, Pengyuan et al., "Multi-Oriented Scene Text Direction via Corner Localization and Region Segmentation", arXiv:1802.08948v2 [cs.CV] Feb. 27, 2018, pp. 12.
Wang, Xiaobing et al., "Arbitrary Shape Scene Text Detection with Adaptive Text Region Representation", arXiv:1905.05980v1 [cs.CV] May 15, 2019, pp. 11.
Shi, Baoguang et al., "An End-to-End Trainable Neural Network for Image-based Sequence Recognition and Its Application to Scene Text Recognition", . . . arXiv:1507.05717v1 [cs.CV] Jul. 21, 2015, pp. 9.
Liu, Yuliang et al., "Detecting Curve Text in the Wild: New Dataset and New Solution", arXiv:1712.02170v1 [cs.CV] Dec. 6, 2017, pp. 9.
Jiang, Yingying et al., "From OCR to STR: Reading Text in the Wild", Samsung Best Paper Award 2018, pp. 9.
Ghosh, Suman K. et al., "Visual attention models for scene text recognition", 2017 14th IAPR International Conference on Document Analysis and Recognition . . . © 2017 IEEE, pp. 6.

* cited by examiner

IMAGE PROCESSING METHOD, APPARATUS, ELECTRONIC DEVICE AND COMPUTER READABLE STORAGE MEDIUM

PRIORITY

This application is a National Phase Entry of PCT International Application No. PCT/KR2019/016928, which was filed on Dec. 3, 2019, and claims priority to Chinese Patent Application No. 201811585134.9, which was filed on Dec. 24, 2018, the entire content of each of which is incorporated herein by reference.

TECHNICAL FIELD

This application relates to the technology field of computer vision and artificial intelligence, in particular to an image processing method, apparatus, electronic device and computer readable storage medium.

BACKGROUND ART

Text information is one kind of important information in images and videos. Many important applications, such as camera translation, smart navigation, blind guiding, content-based retrieval, may be realized, if the text information can be obtained from the images and videos, and the like, which can provide great convenience for people's work and life. Therefore, scene-based text detection and recognition technology is currently a research hotspot in the technology field of computer vision and artificial intelligence.

Although there are many scene-based text detection and recognition methods, most of the existing scene-based text detection methods can only detect linear text, but it is difficult to process arbitrarily oriented text (including horizontal text, oblique text, curved text, etc.); it is usually to use a fixed fourteen points to represent the text region, when realizing the recognition processing of arbitrarily oriented text, the effect of such processing is not ideal, and it is difficult to realize the detection and recognition of arbitrarily oriented text in all cases; meanwhile, the existing text recognition methods do not learn the characteristics of the characters, so the recognition effect is not ideal; in addition, the blurred text usually cannot be processed correspondingly, and it is difficult to recognize the blurred text in the image.

In summary, how to realize the scene-based text recognition, especially arbitrarily oriented text, is a technical problem that needs to be solved now.

DISCLOSURE OF INVENTION

Solution to Problem

The present application provides an image processing method, apparatus, electronic device and computer readable storage medium, to realize the text recognition in the image to be processed, simplify the recognition manner, and improve the recognition effect for the text. The technical solution is as below:

In a aspect, an image processing method is provided. The image processing method comprises detecting of a text region in an image to be processed, recognizing of the text region to obtain a text recognition result.

Advantageous Effects of Invention

This application can provide great convenience for people's work and life by obtaining text information from the images and videos.

BRIEF DESCRIPTION OF DRAWINGS

In order to more clearly illustrate the technical solutions in the embodiments of the present application, the drawings used in the description of the embodiments of the present application will be briefly described below.

BEST MODE FOR CARRYING OUT THE INVENTION

Figure 1:
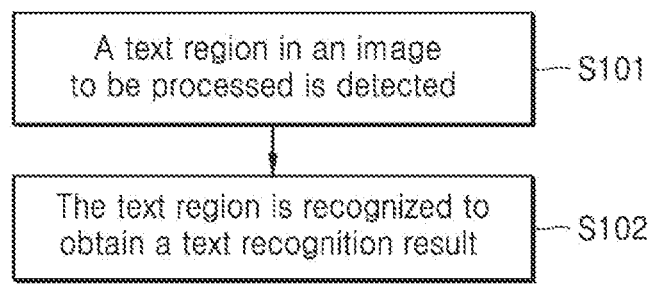
FIG. 1 is a schematic flowchart of an image processing method according to Embodiment 1 of the present application.

The present application provides an image processing method, apparatus, electronic device and computer readable storage medium, to realize the text recognition in the image to be processed, simplify the recognition manner, and improve the recognition effect for the text. The technical solution is as below:

In a first aspect, an image processing method is provided. The image processing method comprises:

detecting of a text region in an image to be processed;

recognizing of the text region to obtain a text recognition result.

In a second aspect, an image processing apparatus is provided. The image processing apparatus comprises:

a detecting unit, configured to detect a text region in an image to be processed; and a recognizing unit, configured to recognize the text region to obtain a text recognition result.

In a third aspect, an electronic device is provided. The electronic device comprises:

a processor; and a memory, configured to store machine readable instructions, that when executed by the processor, causing the processor to perform the above-described image processing method.

In a fourth aspect, a computer readable storage medium is provided, wherein the computer readable storage medium is for storing computer instructions, and when executed on a computer, causing the computer to perform the above-described image processing method.

The technical effects of the present application include following aspects:

The image processing method obtains a text region in an image to be processed by detecting and processing the text region of the image to be processed; extracts feature information of the text region; further performs recognition according to the extracted feature information, to obtain a text recognition result, thereby realizing the text recognition in the image to be processed, simplifying the recognition manner for the text in the image, and improving the recognition effect for the text.

MODE FOR THE INVENTION

The present application provides an image processing method, apparatus, electronic device, and computer readable storage medium. The specific embodiments of the present application are described in detail below with reference to the accompanying drawings.

Embodiments of the present application will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present application and should not be regarded as any limitations thereto.

It should be understood by those skill in the art that singular forms "a", "an", "the", and "said" may be intended to include plural forms as well, unless otherwise stated. It should be further understood that terms "include/including" used in this specification of the present application specify the presence of the stated features, integers, steps, operations, elements and/or components, but not exclusive of the presence or addition of one or more other features, integers, steps, operations, elements, components, and/or combinations thereof. It should be understood that when an element is referred to as being "connected to" or "coupled to" another element, it may be directly connected or coupled to other elements or provided with intervening elements therebetween. In addition, "connected to" or "coupled to" as used herein may include wireless connection or coupling. As used herein, terms "and/or" include all or any of one or more of associated listed items or combinations thereof.

It should be understood by a person of ordinary skill in the art that, unless otherwise defined, all terms (including technical and scientific terms) used herein have the same meaning as commonly understood by those skill in the art to which the present application belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

Based on the corresponding technologies provided in the present application, the technical solutions of the present application and how to solve the above technical problem by the technical solutions of the present application are described in detail in the following specific embodiments. The following specific embodiments may be combined with each other, and the same or similar concepts or processes may not be described in some embodiments. Embodiments of the present application will be described below with reference to the accompanying drawings.

Embodiment 1

The present application provides an image processing method, as shown in FIG. 1. The method includes the following steps:

Step S101: A text region in an image to be processed is detected.

Wherein, an output result of Step S101 may be the location information of the text region in the image to be processed.

Step S102: The text region is recognized to obtain a text recognition result.

In the embodiment of the present application, the text recognition in the image to be processed is realized, the recognition manner for the text in the image is simplified, and the recognition effect for the text is improved.

Embodiment 2

Figure 2:
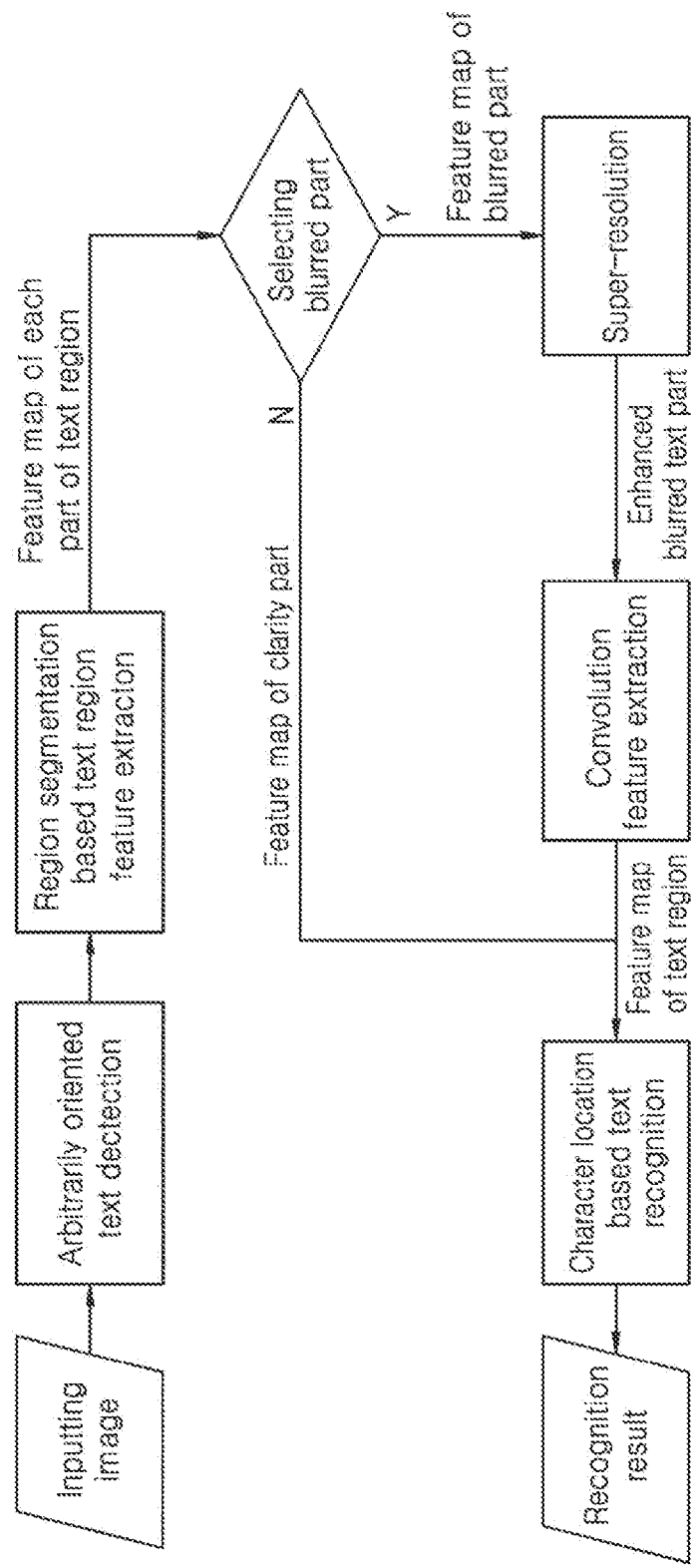
FIG. 2 is a schematic flowchart of a detailed processing manner of an image processing method according to Embodiment 2 of the present application.

The embodiment of the present application provides another possible implementation manner. On the basis of the Embodiment 1, the processing manner shown in the Embodiment 2 is further included. As shown in FIG. 2, the complete processing flow of the image processing method includes the following steps:

S1, an image to be processed is input.

S2, an Arbitrarily Oriented Text Detection is performed, that is, the text region is detected in image to be processed.

Wherein, the present scheme proposes an arbitrarily oriented text detection based on adaptive text region representation, which can adaptively determine different number of text region contour points to represent corresponding text region, and can detect the position of the arbitrarily oriented text (including horizontal text, oblique text, curved text, etc.) in the image.

S3, for the text region detected by step S2, this scheme proposes a Region Segmentation Based Text Region Feature Extraction. The text region is segmented into a plurality of parts based on the text region contour points, the feature of each part is extracted respectively, and the extracted feature of each part is then combined to obtain the features of the text region.

It should be noted that, besides step S2, the text region may be detected and obtained according to the text region detection method in the prior art, and then the region segmentation in step S3 may be performed.

S4. Reinforcement learning Based Burred Part Feature Enhancement is performed, which determines which part of the text region is blurred, that is, selecting the blurred part, and super-resolution processing is performed on the blurred part according to a feature map of the blurred part to obtain the enhanced blurred text part, and then convolution feature extraction is performed on it and the original features are replaced with new features.

S5. Character Location Based Text Recognition is performed, which performs estimation based on the features of the text region to obtain a character position and/or a character category, thereby accurately recognizing the text in the image and obtaining a text recognition result.

It should be noted that step S3-step S5 are optional steps, and the text region may be recognized according to the prior art without executing the processes of step S3-step S5, to obtain the text recognition result.

Furthermore, at least one step of the step S3-step S5 may be performed, or all steps of the step S3-step S5 may be performed, and it is not limited herein.

Embodiment 3

Figure 3:
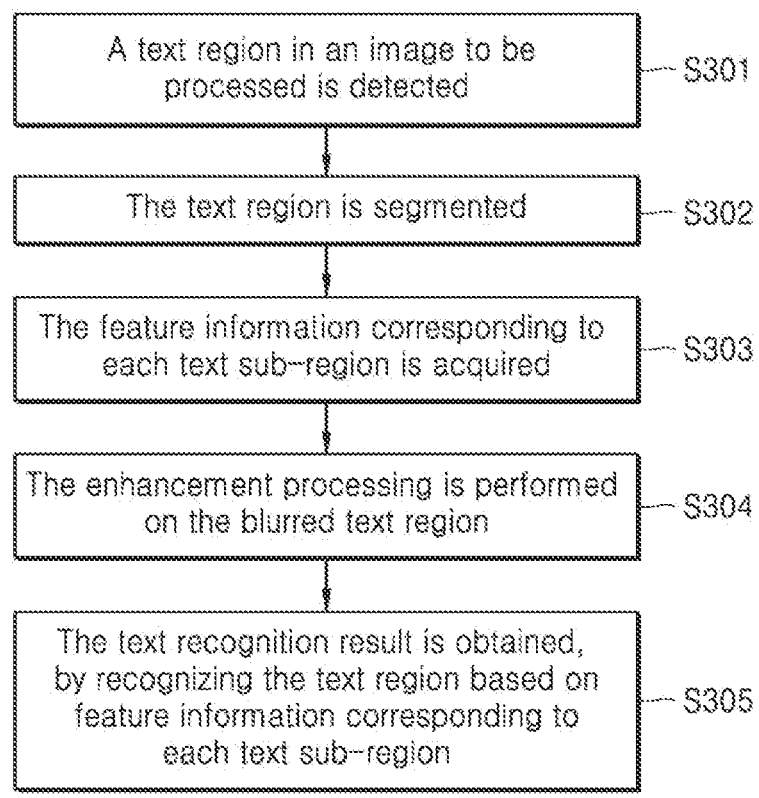
FIG. 3 is a complete schematic flowchart of an image processing method according to Embodiment 3 of the present application.

Based on the technical solutions provided in the Embodiment 1 and the Embodiment 2 of the present application, the image processing solution is specifically described in the following embodiment. As shown in FIG. 3, in this embodiment, the following steps are included:

Step S301, the text region in the image to be processed is detected.

Figure 4:
FIG. 4 is a schematic diagram of different numbers of contour points being used in different text regions in the prior art.

Most of the prior art can only detect linear text, or use a fixed fourteen contour points to detect curved text, but it is unreasonable to use a fixed number of contour points to represent the text region. For example, the linear text on the left of the FIG. 4 can be represented by four contour points. The simple curve text in the middle of the FIG. 4 can be represented by six contour points, while the wavy curved text may require sixteen contour points to represent. Therefore, the present embodiment proposes a text detection method based on the adaptive text region representation, which can adaptively determine the number of contour points for the text region representation, thereby accurately detecting the text region in the image.

Furthermore, step S301 specifically includes:
predicting of text region contour points in the image to be processed;
detecting of the text region in the image to be processed according to the predicted text region contour points.

Wherein, predicting of text region contour points in the image to be processed includes:
acquiring of text enclosing regions of the image to be processed;
predicting of text region contour points according to feature information of the text enclosing region.

The detecting of the text region in the image to be processed according to the predicted text region contour points, includes:
determining of the text region based on the predicted text region contour points in the text enclosing region.

Specifically, the predicting of text region contour points according to feature information of the text enclosing region, includes the following two manners:
1) predicting of text region contour points, based on a recurrent neural network, according to feature information of the text enclosing region.
2) performing of a text region segmentation to the text enclosing region according to the feature information of the text enclosing region, and predicting of endpoints corresponding to the text region contour in the text enclosing region; and determining of corner points on the text region contour, based on a result of the text region segmentation; determining of the text region based on the obtained endpoints and corner points; wherein, text region contour points include endpoints and corner points.

The text region in the image to be processed can be detected by using the following two manners.

(1) Step S3011, the text enclosing region of the image to be processed is acquired.

In a specific embodiment, for the input image, a convolutional neural network (CNN) is used to extract a convolution feature map of the image, and candidate text regions in the image are obtained based on the extracted convolution feature map, this is the candidate text region extraction network; then, for the extracted candidate text region, text/non-text classification and polygon regression are performed to obtain a rectangular polygon of the text region (the rectangular polygon is the above-described text enclosing region).

Figure 5A:
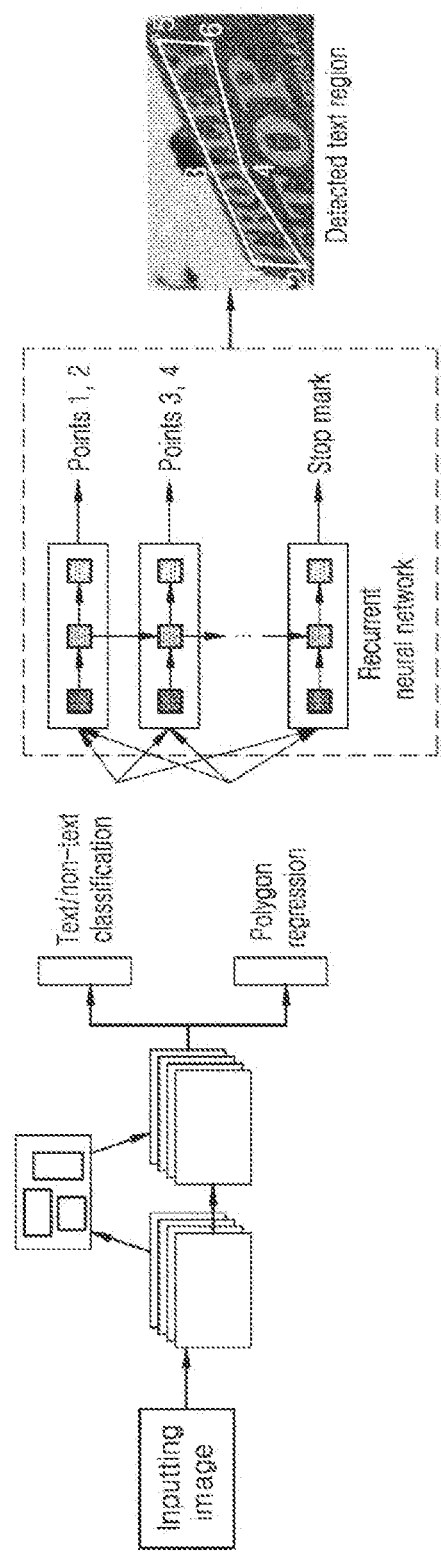
FIG. 5a is a schematic diagram of text region extraction based on a recurrent neural network of an image processing method according to Embodiment 3 of the present application.
Figure 5B:
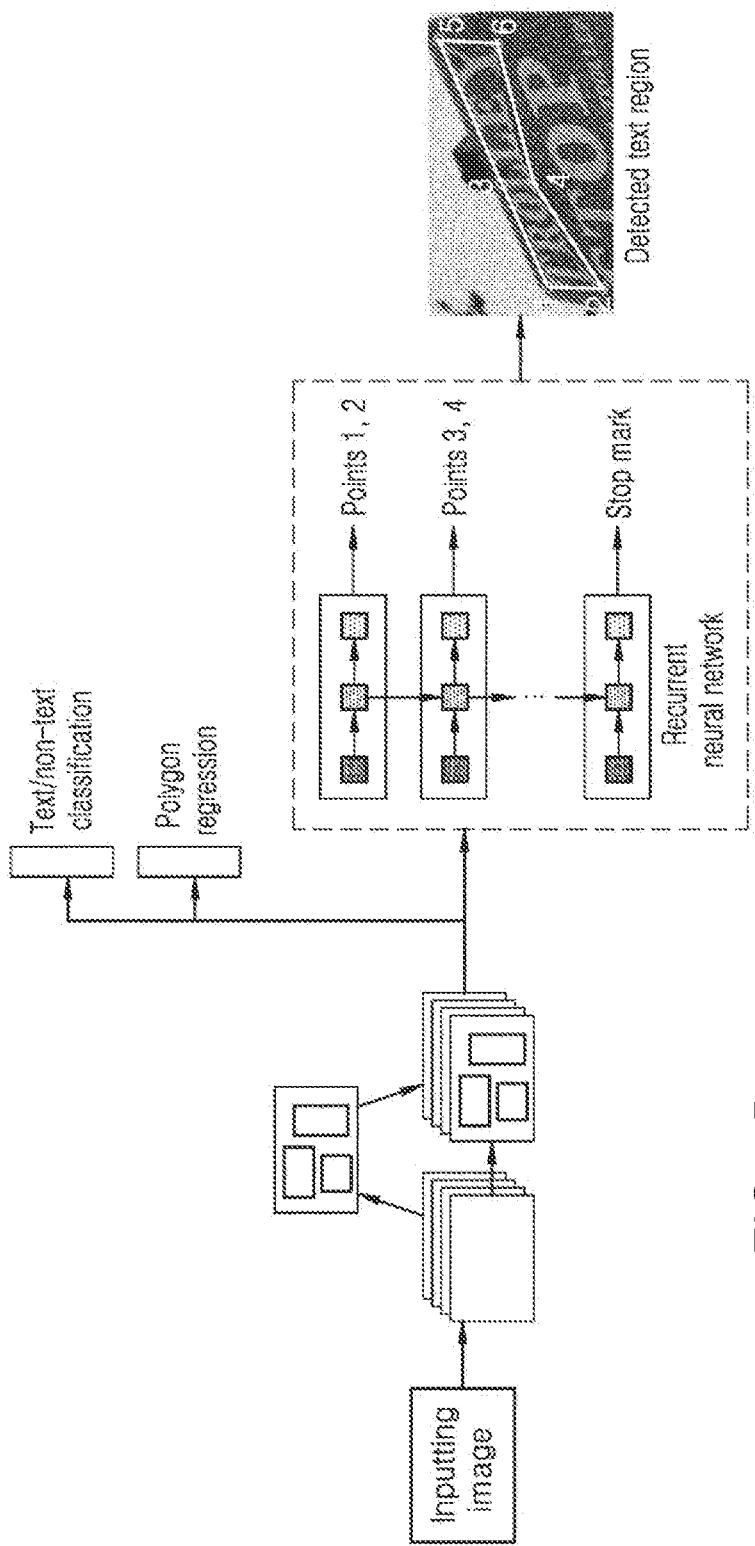
FIG. 5b is a schematic diagram of a training stage of a text region extraction based on a recurrent neural network of an image processing method according to Embodiment 3 of the present application.

In the online test stage, the final detected polygon of the text region can be used as a text enclosing region for subsequent processing, that is, contour point prediction is performed based on the precise text enclosing region, as shown in FIG. 5a; and in the training stage, text/non-text classification, polygon regression, and contour point prediction based on recurrent neural network can be learned simultaneously, that is, contour point prediction based on recurrent neural network can be performed based on candidate text region, that is, contour point prediction can be performed based on rough text enclosing regions, as shown in FIG. 5b.

Step S3012, text region contour points in the text enclosing region are predicted, based on a recurrent neural network, according to feature information of the text enclosing region.

In this step, predicting of text region contour points, based on a recurrent neural network, according to feature information of the text enclosing region, includes:
A1: predicting at least one text region contour point, based on the recurrent neural network, according to the feature information of the text enclosing region;
A2: predicting at least one other contour point, based on the recurrent neural network, according to the feature information of the text enclosing region and the predicted contour point; wherein, text region contour points can be predicted, by predicting a set number of text region contour points each time and in the set direction. For example, the text region contour points can be predicted by predicting one contour point each time and in a clockwise direction, until all the contours are obtained; the text region contour points can be predicted by predicting two contour points each time, and in a direction of a text center line from a beginning to an end of the text, until all the contour points are obtained.

The step A2 is performed repeatedly, until no new contour point is predicted by the recurrent neural network.

Wherein, the recurrent neural network is obtained by training in the following ways:

the contour points are marked for the text region contour in the training sample, wherein the marked number of contour points is different for the text region contours with different degrees of curvature;

the recurrent neural network is trained by using the training sample after contour points being marked.

The recurrent neural network obtained by the training is used to predict the text region contour points of the image to be processed, and the obtained number of contour points is related to the degree of curvature of the text region contour to be processed. For example, in FIG. 4, the text region contour points predicted by the recurrent neural network can be four, if the text region is a linear text on the left side; the text region contour points predicted by the recurrent neural network can be six, if the text region is a simple curved text in the middle; and the text region contour points predicted by the recurrent neural network can be sixteen, if the text region is the wavy curved text on the right side.

In a specific embodiment, a part of contour points for the text region representation may be predicted by the recurrent neural network firstly, and then the other contour points are predicted based on the predicted contour points, until no new contour points are predicted. As shown in FIG. 5a, two contour points of 1, 2 are predicted firstly, two contour points of 3, 4 are predicted secondly, then two contour points of 5, 6 are predicted, until the stop symbol is predicted, and the prediction stops. Wherein, during the recurrent neural network performs prediction, the stop symbol can be predicted, if no new contour point is predicted, and the prediction stops, if the stop symbol is predicted.

In this embodiment, the number of contour points predicted by the recurrent neural network each time may be preset. For example, it can preset that two contour points are predicted each time, or it can also preset that one contour point is predicted each time. For example, in FIG. 5a, it is also feasible to predict points of 1, 3, 5, 6, 4, 2 one by one. It is not limited to the above-described prediction order, and any prediction order can be implemented.

Step S3013, the text region is determined, based on predicted contour points.

The text region can be obtained by connecting the predicted contour points sequentially, according to the sequence of the predicted contour points. For example, in FIG. 5a, the points of 1, 3, 5, 6, 4, 2 are sequentially connected to obtain a text region polygon.

(2) step S3011', the text enclosing region of the image to be processed is acquired.

In a specific embodiment, for the input image, the CNN is used to extract a convolution feature map of the image, and candidate text regions in the image are obtained based on the extracted convolution feature map, this is the candidate text region extraction network; then, for the extracted candidate text region, text/non-text classification and polygon regression are performed to obtain a rectangular polygon of the text region (the rectangular polygon is the above-described text enclosing region). The candidate text region in the image obtained based on the extracted convolution feature map can be regarded as a rough text enclosing region, and the detected polygon of the text region can be regarded as an accurate text enclosing region.

Figure 5C:
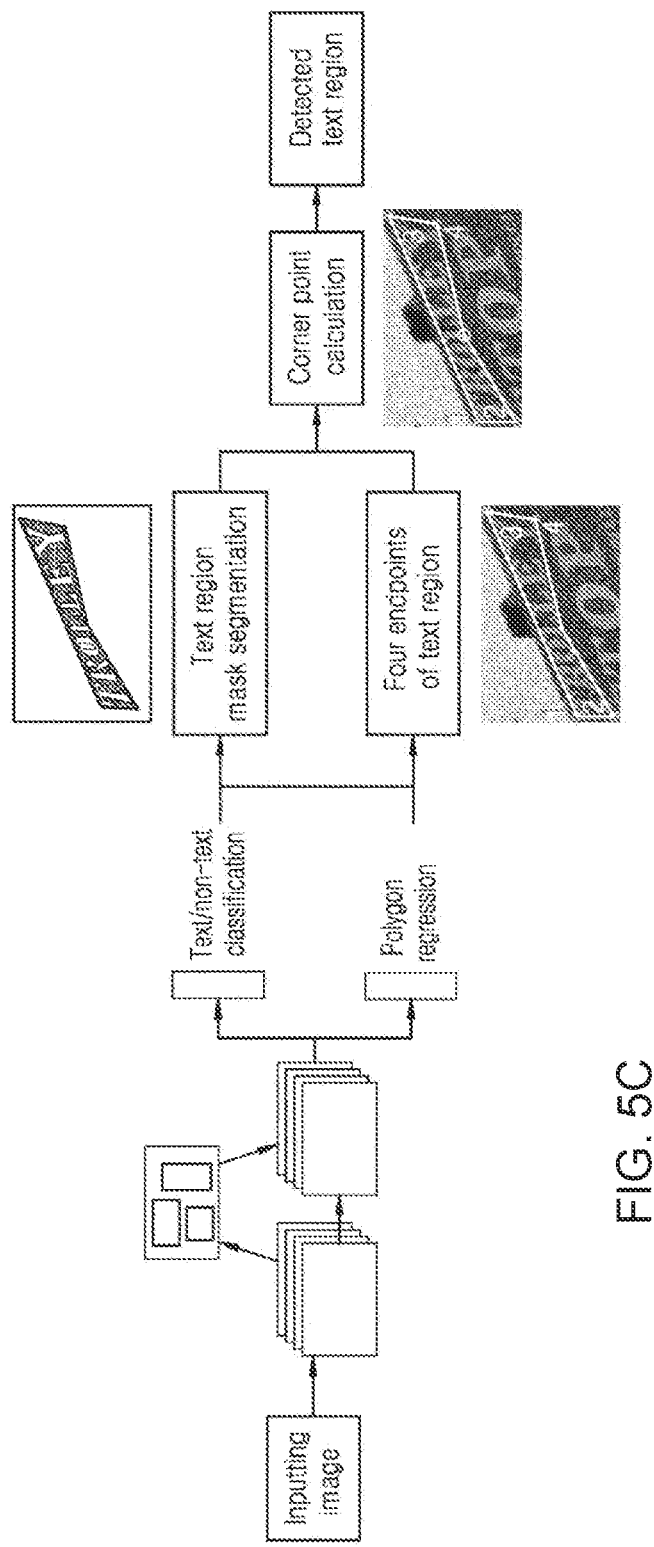
FIG. 5c is a schematic diagram of text region extraction based on image segmentation and corner points of an image processing method according to Embodiment 3 of the present application.
Figure 5D:
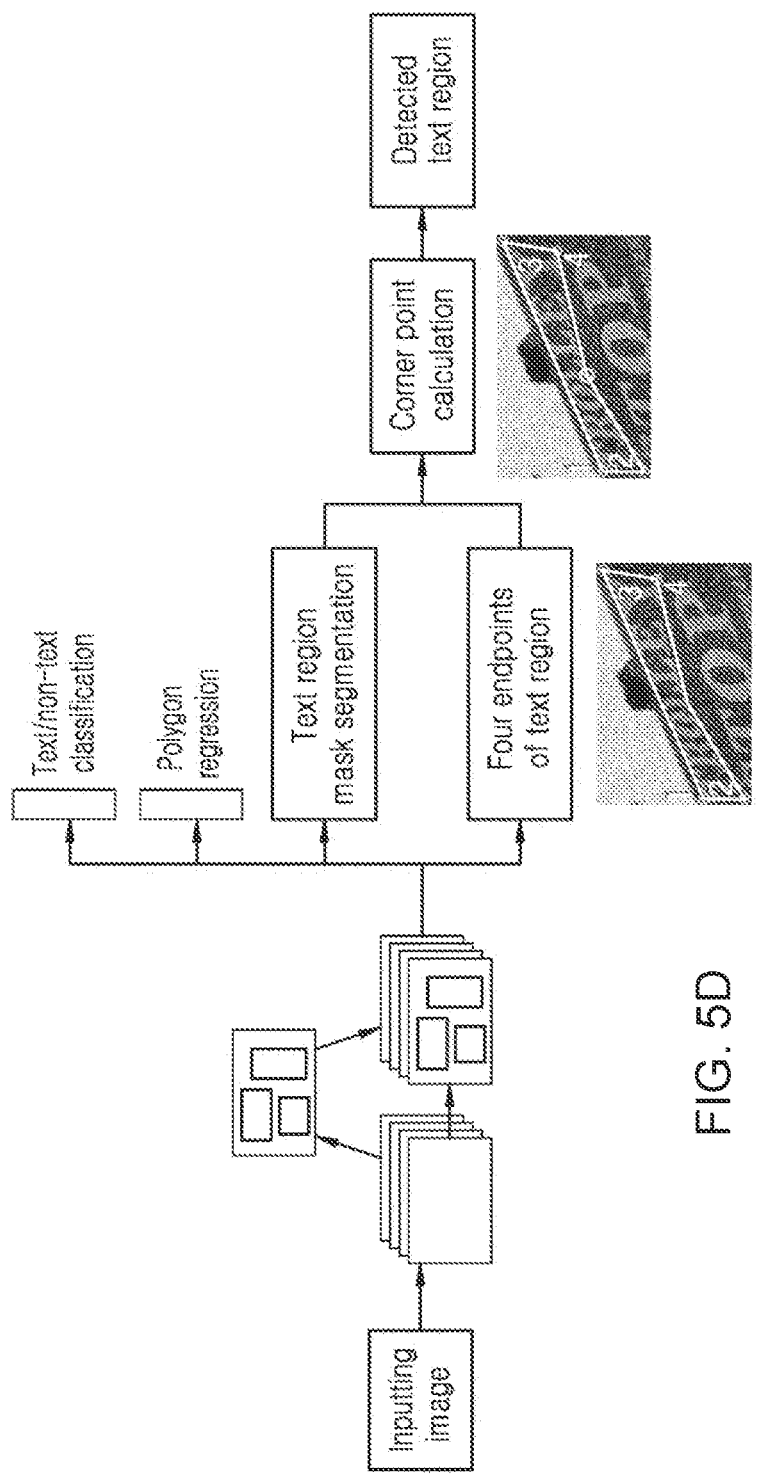
FIG. 5d is a schematic diagram of a training stage of text region extraction based on image segmentation and corner points of an image processing method according to Embodiment 3 of the present application.

In the online test stage, the final detected polygon of the text region can be used as a text enclosing region for subsequent processing, that is, contour point prediction is performed based on the precise text enclosing region, as shown in FIG. 5c; and in the training stage, text/non-text classification, polygon regression, and the contour point prediction based on recurrent neural network can be learned simultaneously, that is, the contour point prediction based on recurrent neural network can be performed based on candidate text region, in other words, the contour point prediction can be performed based on rough text enclosing regions, as shown in FIG. 5d.

This processing is the same as the step S3011, therefore, no detailed description is repeated herein.

Step S3012', a text region segmentation is performed to the text enclosing region according to the feature information of the text enclosing region. Herein, the text region segmentation can be called text region mask segmentation, that is, the text region is distinguish from the background region, wherein, a pixel mark of the text region is 1, and a pixel mark of the background region is 0. Meanwhile, the endpoints corresponding to the text region contour in the text region enclosing region are predicted.

In a specific embodiment, the mask segmentation is performed to the text region, based on the convolution feature map of the text enclosing region, to obtain the contour of the text enclosing region, and the endpoints corresponding to the text region contour in the text enclosing region is predicted. For example, the number of endpoints corresponding to the text region contour is predicted to be four. When performing endpoint prediction, the coordinates of the endpoint can be used as the prediction target, and the endpoint prediction is performed based on the classifier.

Step S3013', the corner points on the text region contour are determined, based on a result of the text region segmentation.

Wherein, the corner point is a point where the angle of the contour changes significantly, and the angle can be determined according to the requirement to determine the corner point. Meanwhile, the corner points on the text region contour contain the endpoints corresponding to the text region contour. In a specific embodiment, the corner points on the text region contour are calculated by the corner point calculation method, and the corner points coincident with the four endpoints of the text region contour are ignored. As shown in FIG. 5d, in the text region contour, points 1, 2, 3, 4 are the four endpoints of the text region, and the points between the points 2 and 4 are the corner points on the contour. In order to facilitate the text region segmentation, the point corresponding to the corner point on the contour from point 1 to point 3 is searched to match with the corner point, while the corner point is obtained.

Step S3014', the text region is determined, based on obtained endpoints and corner points.

The detected text region is represented by the pairs of points determined in above embodiment.

Step S302, the text region is segmented.

The step is an optional step, and the feature information of the text region may be directly extracted without segmenting the text region, and the text recognition may be performed according to the feature information to obtain a text recognition result. Before segmenting the text region, it may be determined whether the text region needs to be segmented into the sub-region needs. The text region may not be segmented into the sub-region, if the number of contour points is small. The text region may be segmented into multiple sub-regions at this time, if the number of contour points is large, for example, that of a curved text. For example, no region segmentation is needed, if the number of contour points is less than or equal to 4; and the text region may be segmented into multiple sub-regions at this time, if the number of contour points is greater than 4, that is, it may be a curved text.

In this step, wherein the segmenting of the text region into at least two text sub-regions, includes:

segmenting of the text region into at least two text sub-regions that do not overlap each other, based on the text region contour points.

Wherein, the contour points selected to constitute the text sub-regions may be contour points adjacent to each other, or the contour points not adjacent to each other.

Figure 6:
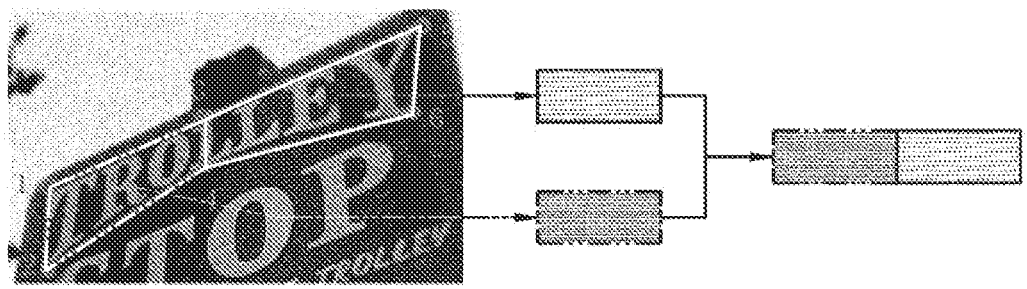
FIG. 6 is a schematic diagram of text region segmentation of an image processing method according to Embodiment 3 of the present application.

In the specific embodiment shown in FIG. 6, it is four adjacent points that are selected to perform text sub-region segmentation; specifically, the text sub-region is composed of the contour points 1, 2, 3, 4, and another text sub-region is composed of the contour points 3, 4, 5, 6, that is, the text region in FIG. 6 is segmented into two text sub-regions. Of course, the embodiment of FIG. 6 is only an example for describing the text region segmentation in the present application, and does not mean that there are only six contour points constituting the text region, for example, there are some text regions of which the contour points are four or twelve or even more; and the embodiment of FIG. 6 does not mean that the text sub-regions obtained by segmenting can only be composed of 4 contour points, for example, the text sub-region can be composed of 3 contour points, or it can be composed of 6 or more contour points.

When segmenting the text region, for some oblique text, since the number of contour points of the text region is small, the text region may not be segmented into at least two sub-regions. For example, as shown in the left figure of FIG. 4a, the text region has 4 contour points, therefore, it is not necessary to segment the text region into sub-regions, but directly recognize the entire text region.

Step S303, the feature information corresponding to each text sub-region is acquired.

After the text region is detected, in order to recognize the text therein, text recognition is required. Since the convolution feature map of the input image has been obtained, the amount of calculation of the convolution feature can be reduced, if the convolution feature of the text region is obtained for recognition based on the spatial position of the detected text region. In order to extract the features of the text region, the present embodiment proposes a region segmentation based text region feature extraction. Because the text region detected by the text detection method in this embodiment is adaptively represented by using an indefinite number of contour points, and the feature extraction methods for the text regions represented by different numbers of contour points are different, the region segmentation may be performed first. The existing method can only obtain the feature of the linear text region, but can not process the curve text, but the feature extraction method based on the region segmentation proposed in the embodiment can process the curve text.

In this step, the acquiring of the feature information corresponding to each text sub-region respectively, includes:

performing of affine transformation on the feature information corresponding to each text sub-region, and obtaining of the feature information corresponding to each text sub-region in horizontal direction.

In the specific embodiment shown in FIG. 6, since the text in the text sub-region may be in any direction, the affine transformation can be performed on the feature information corresponding to each text sub-region; the feature information corresponding to the text sub-region in the set direction is obtained, according to the convolution feature map of the input image and the spatial position of the text sub-region. Wherein, the set direction can be horizontal direction.

The affine transformation process in this step is an unnecessary process, that is, the feature information corresponding to the text sub-region in the set direction can be obtained by affine transformation, or the feature information of the text sub-region can be directly obtained.

Step S304, the enhancement processing is performed on the blurred text sub-region.

This step is an option step, and the enhancement processing may not be performed on the blurred text sub-region.

Figure 7:
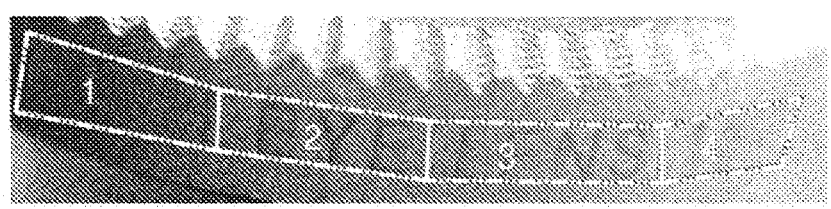
FIG. 7 is a schematic diagram of a blurred text region of an image processing method according to Embodiment 3 of the present application.

Since there may be blurred text in the natural scene image, especially the curved text, some of the text may be clear, and some of the text is blurred, as shown in FIG. 7. It is difficult to accurately recognize the text, if the text is not processed. Therefore, the present embodiment finds blurred text regions, performs super-resolution processing on them to make them clear, and extracts their convolution features for recognition.

In this step, when determining a blurred text sub-region, the method includes:

determining of a blurred text sub-region in each text sub-region; and enhancing of resolution of the determined blurred text sub-region. Wherein, the blurred text sub-region in each text sub-region is determined according to the feature information corresponding to each text sub-region, that is, whether each text sub-region is the blurred region is output.

Figure 8:
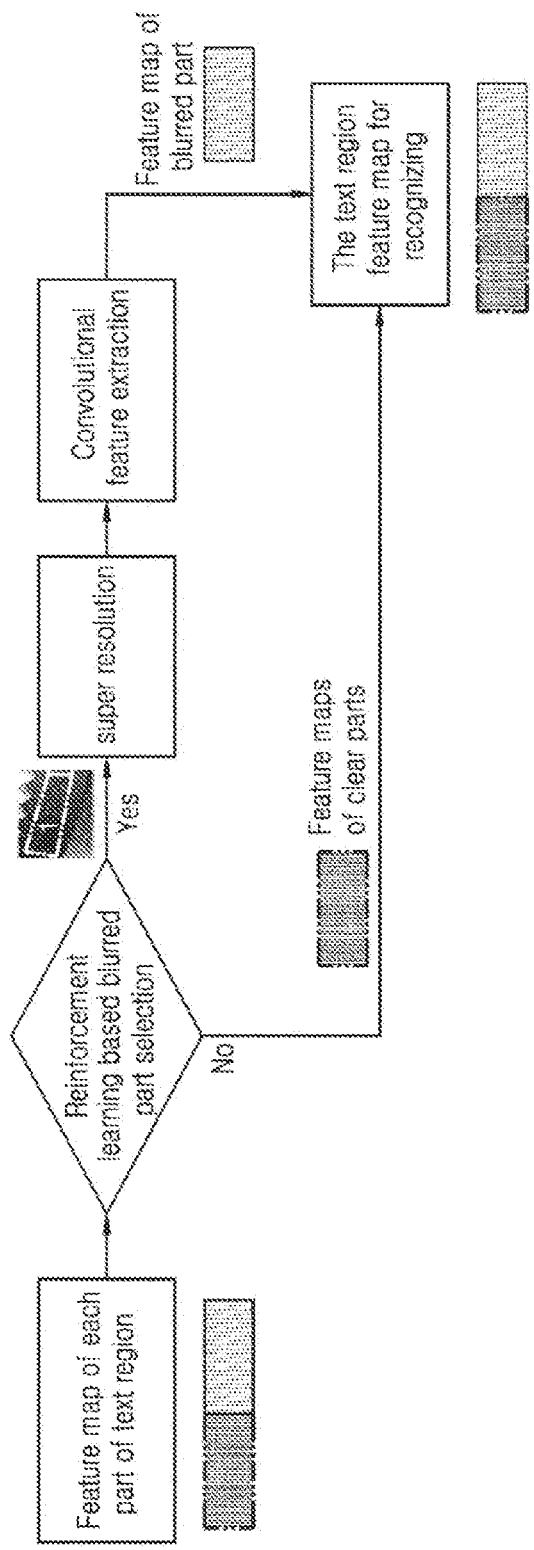
FIG. 8 is a schematic flowchart of processing of a blurred text region of an image processing method according to Embodiment 3 of the present application.

In the specific embodiment shown in FIGS. 7-8, the processing flow can includes:

Step S3041, Reinforcement learning Based Blurred Part Selection.

For a plurality of text sub-regions (i.e., various parts of a text region) which are segmented from a text region by text segmentation, some of the text sub-regions may be clear, and some of the text sub-regions may be blurred. Therefore, in this embodiment, each text sub-region can be analyzed by using an Reinforcement learning Based Blurred Part Selection to determine whether it is blurred.

The formula of reinforcement learning for determining whether a text sub-region is blurred is as shown below:

$$Q^*(s, a) = E[r + \lambda \max_{a'} Q(s', a') | s, a]$$

Wherein, s denotes the state of the text sub-region, a denotes whether the text sub-region is to be selected, r denotes the observation reward for reinforcement learning, s' denotes the state of the new text sub-region, and a' denotes whether the new text sub-region is selected, λ denotes the weight coefficient, and Q*(s, a) denotes the maximum value of reward after the a action is performed in the state s. For example, when it is accurately obtained whether the text region is blurred or not, the reinforcement learning network will receive a huge reward; when the judgment is wrong, the reward is small. Through the manner of continuous learning, the network will accurately determine whether the text region is blurred.

Step S3042, super-resolution enhancement on blurred text sub-region.

An enhancement processing is performed on the selected blurred text sub-region by super-resolution to obtain the processed text sub-region.

Step S3043, feature replacement of blurred text sub-region.

The convolution feature extraction is performed on the blurred text sub-region after the super-resolution processing, to obtain the corresponding feature, and then the current feature (the feature extracted after the super-resolution enhancement processing) replaces the feature in the original text sub-region, to get a new feature of the text sub-region for text recognition.

Step S305, the text recognition result is obtained, by recognizing the text region based on feature information corresponding to each text sub-region.

In this step, the obtaining of the text recognition result, by recognizing the text region based on feature information corresponding to each text sub-region includes:

combining of the feature information corresponding to each text sub-region in the horizontal direction based on the position relationship of each text sub-region, to obtain transformed feature information corresponding to the text region;

recognizing of the text region based on the transformed feature information corresponding to the text region, to obtain the text recognition result.

Wherein, if the feature information of the text sub-region is directly acquired, rather than that the feature information corresponding to the text sub-region in the horizontal direction is obtained by affine transformation, the feature information of each text sub-region can be directly combined based on the position relationship of each text sub-region, to obtain the feature information corresponding to the text region; the text region is recognized, based on the feature information corresponding to the text region, to obtain the text recognition result.

Specifically, as shown in FIG. 6, the feature information of each text sub-region is combined together, according to the sequence of obtaining each text sub-region when the segmenting the text region, and the feature of the first obtained text sub-region is placed in the front, the feature of the following text sub-region are listed behind in the order in which they appear, to obtain the feature information of the corresponding text region.

In the embodiment of the present application, not only the recognition processing of the text region having the curved text, but also the processing of the text region having the blurred text is realized, the recognition range of the text region is expanded, and the recognition manner of the text in the image is simplified, thereby improving the recognition effect of text.

Embodiment 4

Figure 9:
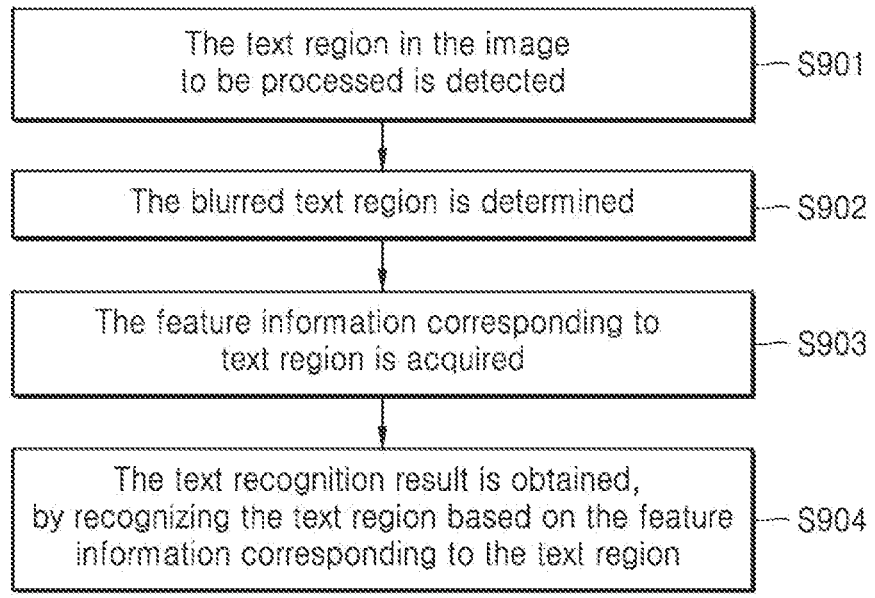
FIG. 9 is a schematic flowchart of an image processing method according to Embodiment 4 of the present application.

Based on the technical solutions provided in the Embodiments 1 to 2 of the present application, the image processing solution is specifically described in the Embodiment 4. As shown in FIG. 9, in this embodiment, the following steps are included:

Step S901, the text region in the image to be processed is detected.

The detection of the text region in the image to be processed in this step is the same as the processing method of step S301 in the Embodiment 3, and therefore will not be elaborated herein.

Step S902, the blurred text region is determined.

In this step, the determining of the blurred text region includes:

determining of a blurred text region in detected text region; and enhancing of resolution of the determined blurred text region.

The specific processing manner is the same as the processing manner of step S304 in the Embodiment 3, and therefore will not be elaborated herein.

Step S903, the feature information corresponding to text region is acquired.

The specific processing manner in this step is the same as the processing manner of step S303 in the Embodiment 3, and therefore will not be elaborated herein.

Step S904, the text recognition result is obtained, by recognizing the text region based on the feature information corresponding to the text region.

The specific processing manner in this step is the same as the processing manner of step S305 in the Embodiment 3, and therefore will not be elaborated herein.

In the embodiment of the present application, the recognition processing of the feature information of the blurred text region is realized by the resolution enhancement processing on the determined blurred text region, and the recognition range of the feature information corresponding to the text region is expanded.

Embodiment 5

The image processing method is specifically described in the Embodiment 5 based on the technical solutions provided in the Embodiments 1 to 2 of the present application.

Figure 11:
FIG. 11 is a schematic diagram of a character position of an image processing method according to Embodiment 5 of the present application.

After obtaining the features of the text region, the text information can be obtained by text recognition. The existing method of text recognition usually predicts the text in the text region, regardless of the position of the character or implicitly considering the position of the character, resulting in less perfect learning of the text feature. This embodiment proposes a character location based text recognition method, which can recognize the spatial position of each character while it being predicted. It can better learn the character features, meanwhile the obtained the position of the character are useful for multiple applications in various aspects, such as augmented reality, real-time translation. As shown in FIG. 11, after the position of the character is obtained, it is more accurate to perform the replacement with translated text when performing the real-time translation.

Figure 10:
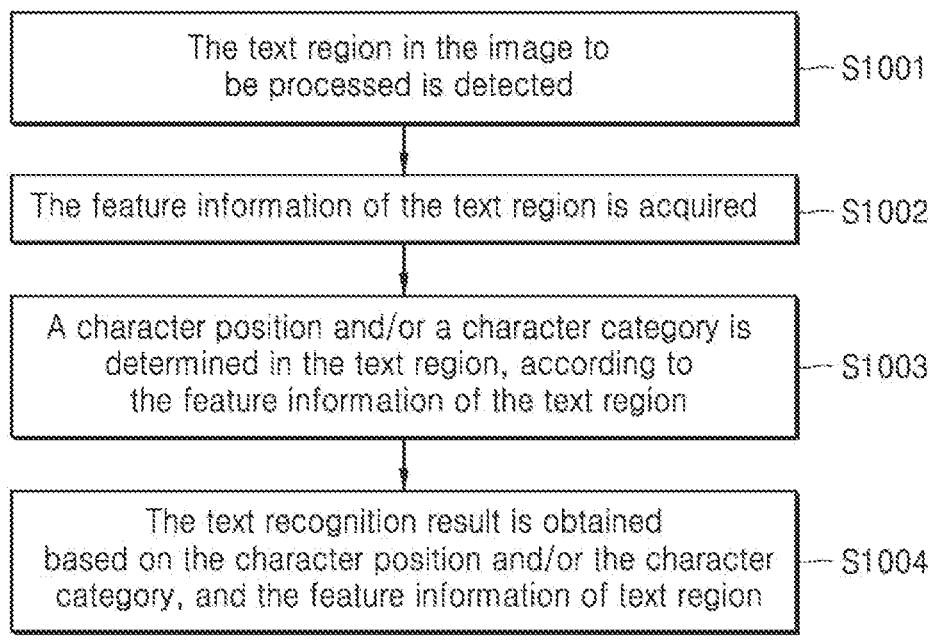
FIG. 10 is a schematic flowchart of an image processing method according to Embodiment 5 of the present application.

As shown in FIG. 10, in this embodiment, the following steps are included:

Step S1001, the text region in the image to be processed is detected.

The detection of the text region in the image to be processed in this step is the same as the processing manner of step S301 in the Embodiment 3, and the text region can be detected by the text region detection method in the prior art, so it is not elaborated herein.

Step S1002, the feature information of the text region is acquired.

The specific processing manner in this step may be the same as the processing manner of step S303 in the Embodiment 3, and therefore it is not elaborated here.

Step S1003, a character position and/or a character category is determined in the text region, according to the feature information of the text region.

In this step, the determining of a character position and/or a character category in the text region, according to the feature information of the text region includes:

encoding of the feature information corresponding to the text region, based on a Bidirectional Long Short-term Memory (BLSTM), to obtain corresponding sequence feature information; and decoding of the sequence feature information, to obtain a character position and/or a character category in the text region.

Figure 12:
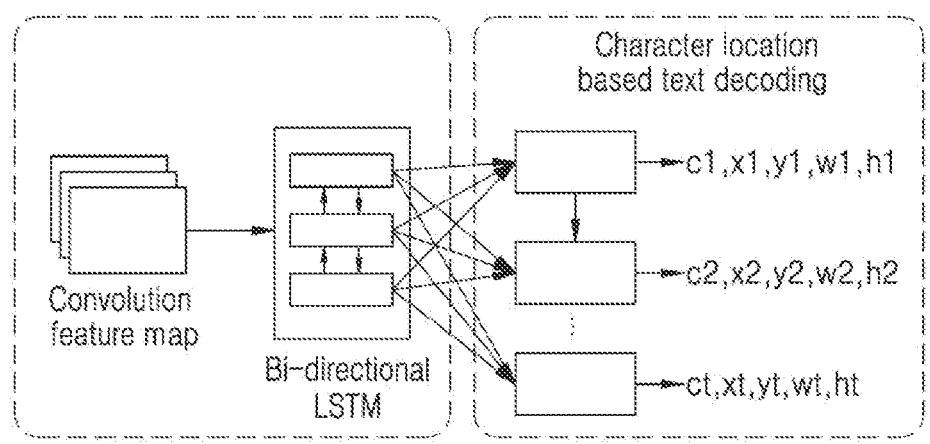
FIG. 12 is a schematic flowchart of text recognition processing based on character positions and/or character categories in an image processing method according to Embodiment 5 of the present application.

In the specific embodiment shown in FIGS. 11-12, the feature information (convolution feature map) of the text region is input into BLSTM to be encoded, therefore obtaining the sequence feature information corresponding to the text region; the sequence feature information corresponding to the text region is decoded by the recurrent neural network, which is combined with the attention model (also referred to as character location based text decoding); and information including character position and/or character category is output each time, until the stop symbol is predicted, and the decoding ends to obtain the character position and/or character category in the text region. Wherein, $c\_1, c\_2, \ldots, c\_n$ denotes the category of each character in the text region, $x\_1, x\_2, \ldots, x\_n$ denotes the horizontal coordinate of the center point of each character, $y\_1, y\_2, \ldots, y\_n$ denotes the vertical coordinate of the center point of each character, $w\_1, w\_2, \ldots, w\_n$ denotes the width of each character, $h\_1, h\_2, \ldots, h\_n$ denotes the height of each character, and $t$ is a natural number not less than 1.

Step S1004, the text recognition result is obtained based on the character position and/or the character category.

In the embodiment of the present application, the prediction of the spatial position of each character is realized, and also each character can be recognized, to better learn the feature information of the character; and the obtained position information of the character is very helpful for multiple applications in various aspects, such as augmented reality, real-time translation. For example, during the real-time translation, obtaining of the position information of each character can accurately segment these characters and replace them with the translated target language.

The text detection and recognition method in the present application can be used in multiple application scenarios:

1) Augmented reality based real-time translation. Different from that only the text in horizontal direction can be recognized in the existing translation method, this method can detect and recognize of text in any direction, including curved text, text in vertical direction, and the like. It can handle text translation in any direction in a natural scene, if the method is applied to real-time translation.

Figure 15:
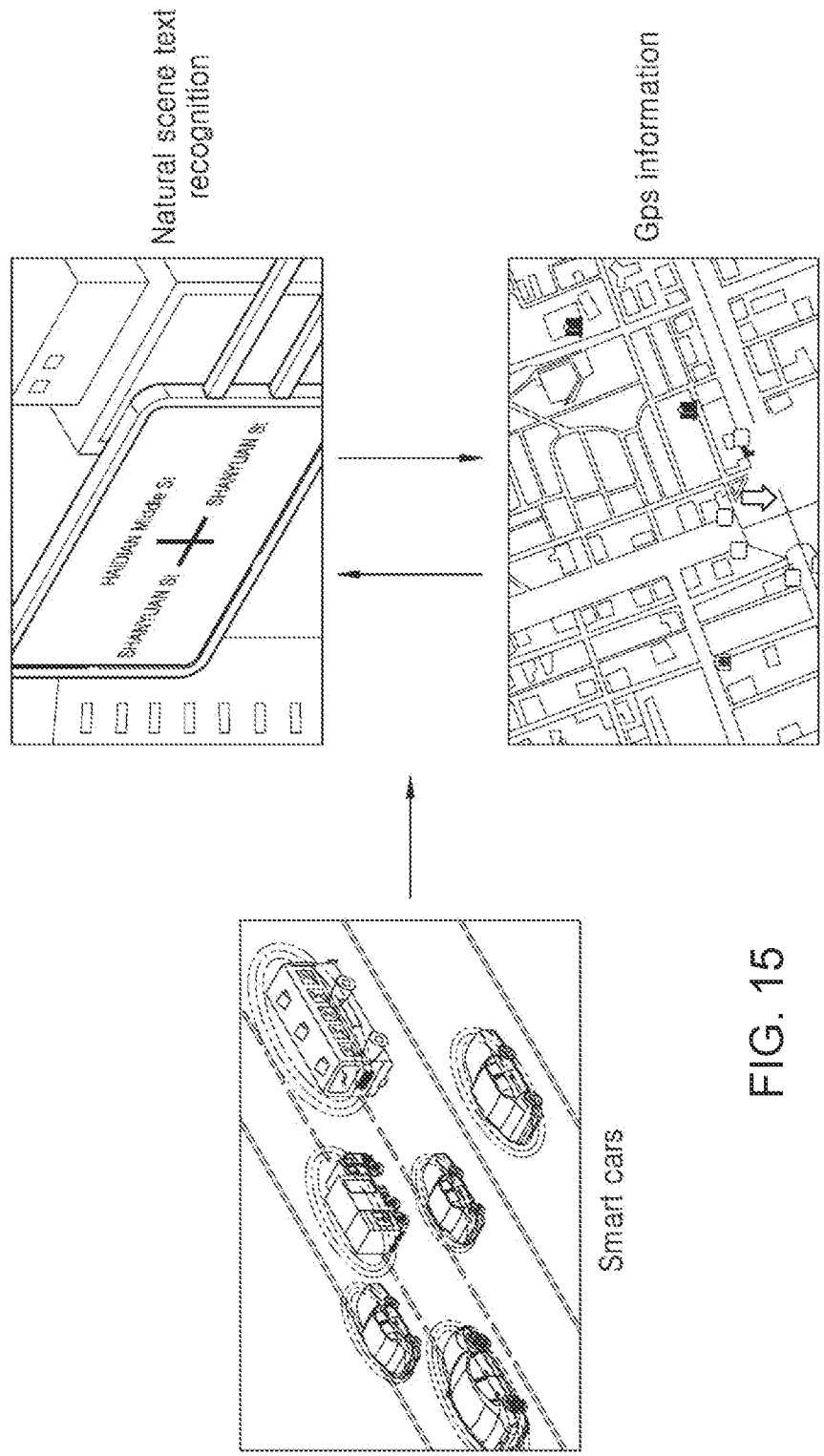
FIG. 15 is a schematic diagram of an image processing method applied to intelligent navigation according to an embodiment of the present application.

2) Intelligent navigation. For smart cars, single GPS signals may drift when performing location, and the position of the car can be accurately located, if adding the natural scene text recognition method in this application to recognize road traffic signs and building names; meanwhile, this method can also filter the recognition results when combined with the GPS signal, to get a more accurate recognition result, therefore a more accurate position information for navigation may be obtained, by mutual promotion between them, as shown in FIG. 15.

3) Smart refrigerator. In smart refrigerators, fisheye cameras are often used to capture images, while images captured by fisheye cameras often contain curved text. The text recognition methods in prior art are difficult to handle curved text, while the method of the present application is able to recognize curved text. By recognizing the text on the package of the product in the refrigerator, the name, type, shelf life, and the like of the product can be determined. Based on this information, the user can be reminded to eat food before the shelf life, thereby creating a more intelligent refrigerator.

Embodiment 6

Figure 13:
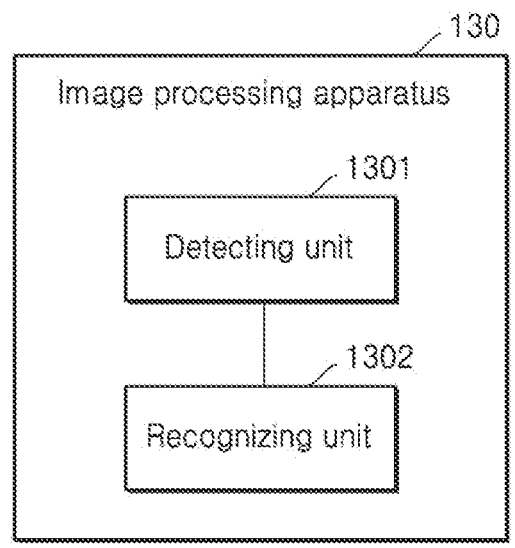
FIG. 13 is a schematic structural diagram of an image processing apparatus according to Embodiment 6 of the present application.

The embodiment of the present application provides an image processing apparatus 130, as shown in FIG. 13, including: a detecting unit 1301 and a recognizing unit 1302.

The detecting unit 1301 is configured to detect a text region in an image to be processed.

a recognizing unit 1302 is configured to recognize the text region to obtain a text recognition result.

The detecting unit 1301 is specifically used to predict text region contour points corresponding to the image to be processed; and detect the text region in the image to be processed according to the predicted text region contour points.

Furthermore, the detecting unit 1301 is specifically used to acquire a text enclosing region of the image to be processed; predict text region contour points in the text enclosing region according to feature information of the text enclosing region; and determine the text region, based on the predicted text region contour points in the text enclosing region.

Furthermore, the detecting unit 1301 is specifically used to predict text region contour points in the text enclosing region, based on a recurrent neural network, according to feature information of the text enclosing region.

Furthermore, the detecting unit 1301 is specifically used to:

A1: predict at least one text region contour point in the text enclosing region, based on the recurrent neural network, according to the feature information of the text enclosing region; and A2: predict at least one other contour point, based on the recurrent neural network, according to the feature information of the text enclosing region and the predicted contour point;

perform the step A2 repeatedly, until no new contour point being predicted by the recurrent neural network.

Wherein, a manner of predicting text region contour points includes:

predicting of text region contour points in the set direction, and/or, predicting of a set number of text region contour points each time.

The predicting of text region contour points in the set direction, and predicting of a set number of text region contour points each time, includes any one of the following situations:

predicting of text region contour points by predicting one contour point each time and in a clockwise direction, until no new contour point is not predicted; and predicting of text region contour points by predicting two contour points each time, and in a direction of a text center line from a beginning to an end of the text, until no new contour points are predicted.

The recurrent neural network is obtained by training in the following ways:

training of the recurrent neural network by using training samples in which the contour points in the text region contour are marked, wherein the number of contour points marked is different for the text region contours with different degrees of curvature.

The detecting unit 1301 is specifically used to perform a text region segmentation to the text enclosing region according to the feature information of the text enclosing region, and predict endpoints corresponding to the text region contour in the text enclosing region; and determine corner points on the text region contour, based on a result of the text region segmentation.

The recognizing unit 1302 is further used to segment the text region into at least two text sub-regions; acquire the feature information corresponding to each text sub-region respectively; and obtain the text recognition result, by recognizing the text region, based on feature information corresponding to each text sub-region.

The recognizing unit 1302 is further used to determine a blurred text sub-region in each text sub-region; and enhance resolution of the determined blurred text sub-region.

The recognizing unit 1302 is further used to perform affine transformation on the feature information corresponding to each text sub-region, and obtain the feature information corresponding to each text sub-region in horizontal direction.

The recognizing unit 1302 is further used to combine the feature information corresponding to each text sub-region in set direction based on a position relationship of each text sub-region, to obtain the transformed feature information corresponding to the text region; and recognize the text region based on the transformed feature information corresponding to the text region, to obtain the text recognition result.

The recognizing unit 1302 is further used to combine the feature information of each text sub-region based on the position relationship of each text sub-region, to obtain feature information corresponding to the text region; and recognize the text region based on the feature information corresponding to the text region, to obtain the text recognition result.

The recognizing unit 1302 is further used to determine a blurred text region in detected text region; enhance resolution of the determined blurred text region; acquire the feature information corresponding to the text region; and obtain the text recognition result, by recognizing the text region, based on the feature information corresponding to the text region.

The recognizing unit 1302 is further used to acquire the feature information of the text region; determine a character position and/or a character category in the text region, according to the feature information of the text region; and obtain the text recognition result based on the character position and/or the character category.

The recognizing unit 1302 is further used to encode the feature information corresponding to the text region, based on a BLSTM, to obtain corresponding sequence feature information; and decode the sequence feature information, to obtain a character position and/or a character category in the text region.

Embodiment 7

Figure 14:
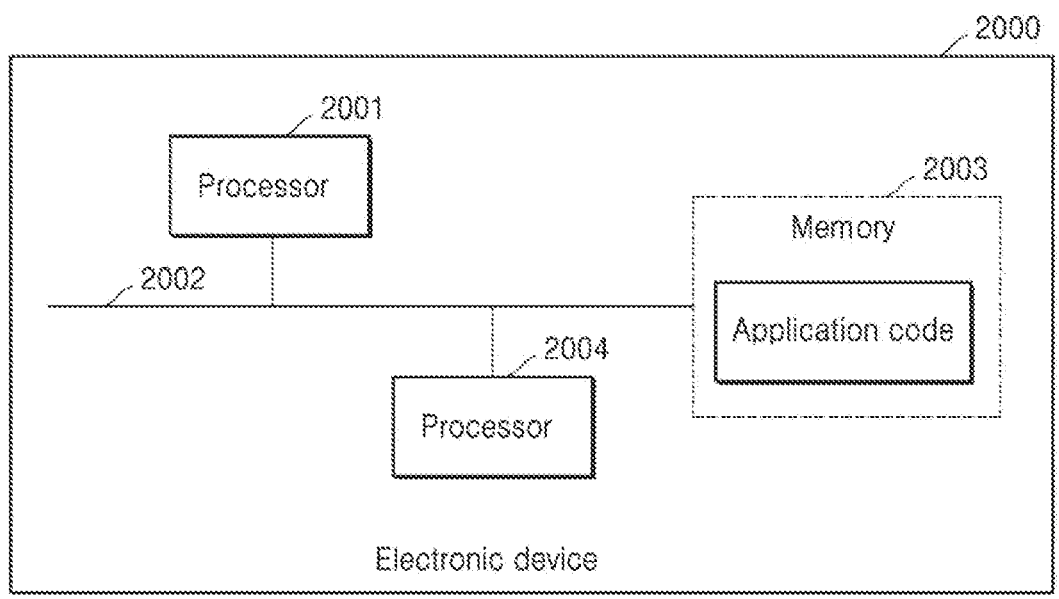
FIG. 14 is a schematic structural diagram of an electronic device of an image processing method according to Embodiment 7 of the present application.

The embodiment of the present application provides an electronic device. As shown in FIG. 14, the electronic device 2000 shown in FIG. 14 includes a processor 2001 and a transceiver 2004. The processor 2001 is connected to the transceiver 2004, for example, through the bus 2002. Optionally, the electronic device 2000 may further include a memory 2003. It should be noted that, the transceiver 2004 is not limited to one in the actual application, and the structure of the electronic device 2000 does not constitute a limitation on the embodiments of the present application.

The processor 2001 is applied to the embodiment of the present application for implementing the function of the recognizing unit 1302 shown in FIG. 13. The transceiver 2004 includes a receiver and a transmitter, and the transceiver 2004 is applied to the embodiment of the present application for implementing the function of the detecting unit 1301 shown in FIG. 13.

The processor 2001 can be a Central Processing Unit (CPU), a general purpose processor, a Digital Signal Processor (DSP), an Application Specific Integrated Circuit (ASIC), an Field Programmable Gate Array (FPGA) or other programmable logic device, a transistor logic device, a hardware component, or any combination thereof. It is possible to implement or carry out the various example logical blocks, modules and circuits described in connection with the present disclosure. The processor 2001 can also be a combination for implementing of computing functions, such as a combination including one or more microprocessor, a combination of a DSP and a microprocessor, and the like.

The bus 2002 can include a path for communicating information between the above components. The bus 2002 can be a Peripheral Component Interconnect (PCI) bus or an Extended Industry Standard Architecture (EISA) bus or the like. The bus 2002 can be classified into an address bus, a data bus, a control bus, and the like. For ease of representation, the bus is represented only by one thick line in FIG. 14, but it does not mean that there is only one bus or one type of bus.

The memory 2003 can be a Read Only Memory (ROM) or other type of static storage device that can store static information and instructions, Random Access Memory (RAM) or other types of dynamic storage devices that can store information and instructions, and can also be Electrically Erasable Programmable Read-Only Memory (EEPROM), Compact Disc Read-Only Memory (CD-ROM) or other optical disk storage medium (including compact disc, laser disc, optical disc, digital versatile disc, Blu-ray disc, etc.), magnetic disk storage medium or other magnetic storage devices, or can be any other media used to carry or store desired program code in the form of instructions or data structures and can be accessed by the computer, but the media not limited to this.

Optionally, the memory 2003 is used to store application code for executing the solution of the present application, and is controlled by the processor 2001 for execution. The processor 2001 is configured to execute application code stored in the memory 2003 to implement the actions of the image processing apparatus provided by the embodiment shown in FIG. 13.

The embodiment of the present application provides a computer readable storage medium, wherein the computer readable storage medium stores a computer program, and when the program is executed by the processor, the method shown in any one of Embodiments 1 to 5 is implemented.

In the embodiment of the present application, not only the recognition processing of the text region having the curved text, but also the processing of the text region having the blurred text is realized, the recognition range of the text region is expanded, and the recognition manner of the text in the image is simplified, thereby improving the recognition effect of text.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

The modules of the apparatus of the present application may be integrated into one body or may be deployed separately. The above modules can be combined into one module, or can be further segmented into multiple sub-modules.

It may be understood by those skilled in the art that the drawings are only a schematic diagram of a preferred embodiment, and the modules or processes in the drawings are not necessarily required to implement the application.

It may be understood by those skilled in the art that the modules in the apparatus in the embodiment can be distributed in the apparatus of the embodiment according to the description of the embodiment, or also can be located in one or more apparatus different from that of the embodiment by changing correspondingly. The modules of the above embodiments may be combined into one module, or may be further segmented into multiple sub-modules.

The above serial numbers of the present application are for the purpose of description only and do not represent the advantages and disadvantages of the embodiments.

The above disclosure is only a few specific embodiments of the present application, but the present application is not limited thereto, and any changes that can be made by those skilled in the art should fall within the protection scope of the present application.

The invention claimed is:

1. An image processing method, comprising:
predicting at least one text region contour point in an image to be processed in a set direction until no new contour points are predicted;
detecting a text region in the image according to the predicted at least one text region contour point; and
recognizing the text region to obtain a text recognition result,
wherein one text region contour point is predicted each time in case that the set direction is a clockwise direction, and
wherein two text region contour pints are predicted each time in case that the set direction is a direction of a text center line from a beginning to an end of the text region.

2. The image processing method according to claim 1, wherein:
predicting the at least one text region contour point in the image to be processed comprises:
acquiring text enclosing regions of the image to be processed; and
predicting the at least one text region contour point according to feature information of the text enclosing region; and
detecting the text region in the image according to the at least one predicted text region contour point comprises:
determining the text region based on the at least one predicted text region contour point in the text enclosing region.

3. The image processing method according to claim 2, wherein predicting the at least one text region contour point according to feature information of the text enclosing region comprises:
predicting the at least one text region contour point, based on a recurrent neural network, according to the feature information of the text enclosing region.

4. The image processing method according to claim 3, wherein predicting the at least one text region contour point, based on the recurrent neural network, according to the feature information of the text enclosing region comprises:
repeatedly predicting at least one other text region contour point, based on the recurrent neural network, according to the feature information of the text enclosing region and the at least one predicted text region contour point until no new contour points are predicted by the recurrent neural network.

5. The image processing method according to claim 3, further comprising obtaining the recurrent neural network is obtained by training the recurrent neural network by using a training sample in which the at least one text region contour point is marked, wherein the number of text region contour points marked is different for text region contours with different degrees of curvature.

6. The image processing method according to claim 2, wherein predicting the at least one text region contour point according to the feature information of the text enclosing region comprises:
performing a text region segmentation to the text enclosing region according to the feature information of the text enclosing region, and predicting an endpoint corresponding to a text region contour in the text enclosing region; and
determining a corner point on the text region contour, based on a result of the text region segmentation.

7. The image processing method according to claim 1, wherein recognizing the text region to obtain the text recognition result comprises:
segmenting the text region into at least two text sub-regions;
acquiring respective feature information corresponding to each of the at least two text sub-regions; and
obtaining the text recognition result, by recognizing the text region based on the respective feature information.

8. The image processing method according to claim 7, wherein segmenting the text region into the at least two text sub-regions comprises:
segmenting the text region into the at least two text sub-regions that do not overlap each other, based on the at least one text region contour point.

9. The image processing method according to claim 7, before acquiring the respective feature information, further comprising:
determining a blurred text sub-region in each of the at least two text sub-regions; and
enhancing resolution of the determined blurred text sub-regions.

10. The image processing method according to claim 7, wherein:
acquiring the respective feature information comprises:
performing affine transformation on the respective feature information, and obtaining the respective feature information corresponding to each text sub-region in set direction; and
obtaining the text recognition result, by recognizing the text region based on the respective feature information comprises:
combining the respective feature information in set direction based on a position relationship of each text sub-region, to obtain transformed feature information corresponding to the text region; and
recognizing the text region based on the transformed feature information corresponding to the text region, to obtain the text recognition result.

11. An electronic device, comprising:
a processor; and
a memory, configured to store machine readable instructions, that when executed by the processor, causing the processor to:
predict at least one text region contour point in an image to be processed in a set direction until no new contour points are predicted;
detect a text region in the image according to the predicted at least one text region contour point; and
recognize the text region to obtain a text recognition result, wherein one text region contour point is predicted each time in case that the set direction is a clockwise direction, and wherein two text region contour points are predicted each time in case that the set direction is a direction of a text center line from a beginning to an end of the text region.

12. A computer program product comprising a non-transitory computer readable storage medium having a computer readable program stored therein, wherein the computer readable program, when executed on a computing device, causes the computing device to:

predict at least one text region contour point in an image to be processed in a set direction until no new contour points are predicted;

detect a text region in the image according to the predicted at least one text region contour point; and recognize the text region to obtain a text recognition result, wherein one text region contour point is predicted each tie in case that the set direction is a clockwise direction, and wherein two text region contour points are predicted each time in case that the set direction is a direction of a text center line from a beginning to an end of the text region.

* * * * *